May 9, 1961 H. M. SCHLICKE 2,983,855
DE-RESONATED CAPACITOR
Filed March 20, 1958

INVENTOR
HEINZ M. SCHLICKE
BY Quarles, Hen, Seidel
Bateman & Hoar
ATTORNEYS

United States Patent Office 2,983,855
Patented May 9, 1961

2,983,855
DE-RESONATED CAPACITOR
Heinz M. Schlicke, Fox Point, Wis., assignor to Allen-Bradley Company, Milwaukee, Wis., a corporation of Wisconsin Filed Mar. 20, 1958, Ser. No. 722,761
9 Claims. (Cl. 317—242)

This invention relates to capacitors of the type employing a ceramic dielectric and adherent metallic electrodes and, particularly, to means for de-resonating such capacitors when used at frequencies where the dielectric is subject to cavity resonance phenomena.

Because of their simplicity, mechanical strength and relatively high capacitance values in miniature sizes, capacitors using the so-called titanate ceramics as a dielectric and supporting body with fired metallic electrodes have become popular. These capacitors are generally well suited for high frequency applications in the range from 100 megacycles and upward. Unfortunately, however, the high dielectric constant of the ceramic material produces a propensity for the body to act as a resonant cavity at high frequencies because a half wave length in such a ceramic body is many times less than a half wave length in air. Such resonances produce typical four pole filter effects in a supposed two pole circuit parameter and, hence, at resonant and adjacent frequencies the transfer impedance of such a capacitor is widely divergent from its theoretical or computed reactance.

One important use for such ceramic capacitors is as a feed-through for filament and plate leads to the tuners of television receiving equipment. In this application the conductor passing through the wall of the shielding enclosure is connected to one terminal of a capacitor having its other terminal grounded to the enclosure. Theoretically, at frequencies of 100 megacycles and upward, a capacitor of moderate size would represent a substantial short circuit and, hence prevent undesired frequencies from leaving the tuner enclosure and passing along the filament and plate leads. Actually, however, resonance within the ceramic dielectric of previously known capacitors creates a typical parallel resonant impedance increase in the circuit to ground with the result that the effectiveness of the capacitor is greatly impaired.

Previous feed-through capacitors have been made in many shapes, which are, primarily, variations of discs or tubes. While discoidal feed-through capacitors are less subject to this cavity resonance effect than tubular capacitors because of their shorter critical dimensions, they too exhibit pronounced resonance effects in larger capacity sizes or in relatively large discs adapted to give increased voltage breakdown strength.

It is the principal object of this invention to de-resonate ceramic dielectric capacitor bodies and to accomplish this result without adding elements to the capacitor.

A further object is to provide means for de-resonating such capacitors whether they be tubular or discoidal in configuration.

Another object of the invention is to de-resonate a ceramic capacitor in an inexpensive manner capable of simple mass production.

A further object of the invention is to provide a ceramic capacitor which follows closely its ideal or computed reactance at frequencies above 100 megacycles.

According to the invention, the foregoing objects are accomplished by utilizing at least one electrode comprising contiguous areas of different specific resistance.

Further objects and advantages will be brought out in the following description, in which, for purposes of disclosure, the invention has been illustrated in embodiments useful as feed-through capacitors.

Figure 1:
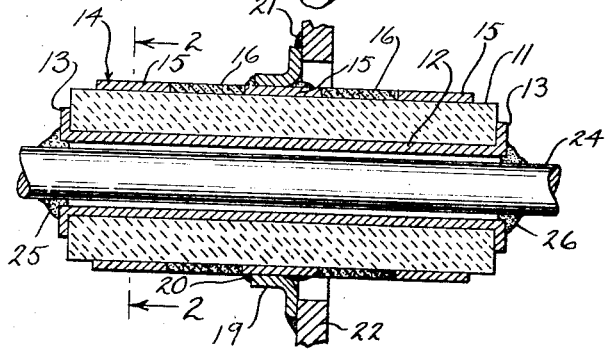
Fig. 1 is an axial section in elevation of a tubular feed-through capacitor in accordance with the invention shown in operative relation to a chassis and supply conductor.

Referring to the details of Fig. 1, the capacitor illustrated therein may be seen to comprise a tubular dielectric body 11 having an electrode 12 disposed on its inner cylindrical surface and continuing along a portion of the annular end surfaces at each end of the tube as at 13. Disposed on the outer cylindrical surface of the dielectric body is a second electrode designated generally as 14 and which, in the embodiment illustrated in Fig. 1, constitutes five contiguous coaxial rings designated, alternately 15 and 16. The portions 15 of outer electrode 14 are preferably of a low specific electrical resistance while the contiguous and abutting rings 16 are of a material having a higher specific electrical resistance. The quantitative differences in specific resistance of these electrode rings and their functional purpose will be discussed subsequently in greater detail.

In Fig. 1, three rings 15 of low resistance and two rings 16 of higher resistance are illustrated, which is illustrative of one form of the invention. As will be clear, subsequently, two low resistance rings and three high resistance rings would function similarly, the important consideration being that contiguous areas of different resistance are employed.

Disposed about one of the electrode rings 15 is a flange 19 which is joined electrically and mechanically to the electrode as by means of a solder film 20. The flange 19 serves as a means for mounting the capacitor as, for example, in an aperture in a chassis 22, mechanical and electrical union being accomplished by a solder film 21. Connection to a conductor, such as that illustrated at 24, is made by solder at either end of the capacitor as at 25 and 26.

Figure 2:
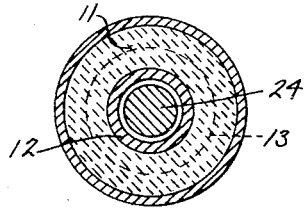
Fig. 2 is a section taken on line 2—2 of Fig. 1.

Fig. 2 illustrates the aforesaid elements in cross section and shows their axial symmetry.

Figure 3:
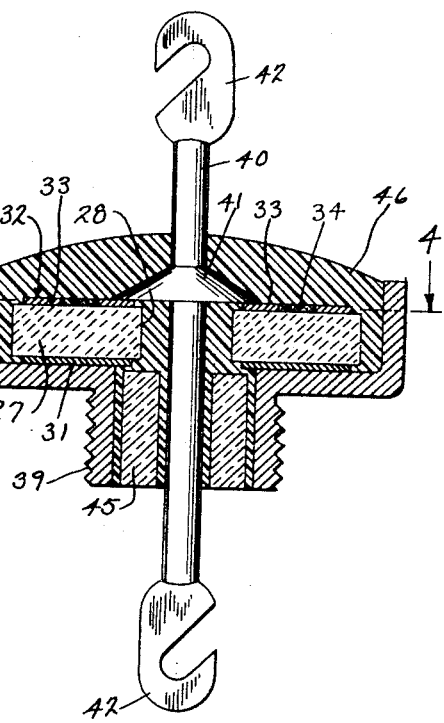
Fig. 3 is a section in elevation of the invention embodied in a discoidal feed-through capacitor.

In Fig. 3 there is illustrated an embodiment of the invention in the form of a discoidal feed-through capacitor which employs a disc shaped ceramic dielectric body 27 having a central aperture 28, a metallic electrode 31 on its lower annular surface and an electrode on its upper annular surface indicated generally as 32. The upper electrode may be seen to comprise a series of coaxial, ring or annular shaped contiguous areas designated 33 and 34, areas 33 being of a low electrical resistance and areas 34 being of a higher electrical resistance.

The capacitor is enclosed in a metallic housing 35 having an upturned flange 36 surrounding the discoidal capacitor and a threaded shank 39 which may be used in conjunction with a nut for mounting the capacitor on a chassis.

Electrical connection to the capacitor is provided by a feed-through conductor 40 having an integral conical collar 41 electrically and mechanically joined to electrode 32, and lugs 42 for circuit connection. The lower electrode 31 is electrically and mechanically joined to housing 35 and is, hence, electrically connected to the chassis when the unit is mounted therein.

Increased mechanical rigidity is provided by a cylindrical ceramic sleeve 45 located within the shank portion 39 of housing 35. A filling of resinous material 46, such as an epoxy resin, which closes all the voids in the capacitor, completes the unit.

Figure 4:
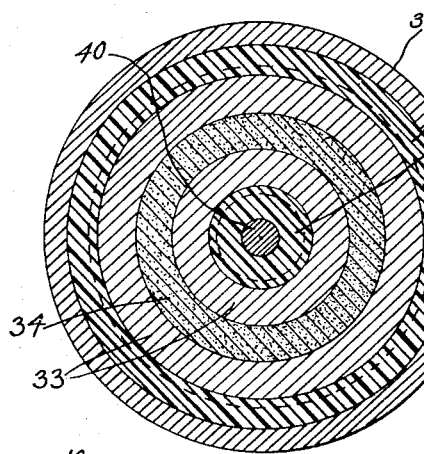
Fig. 4 is a section on the line 4—4 of Fig. 3.

Fig. 4 illustrates the elements of Fig. 3 in cross section and shows their axial symmetry.

Figure 5:
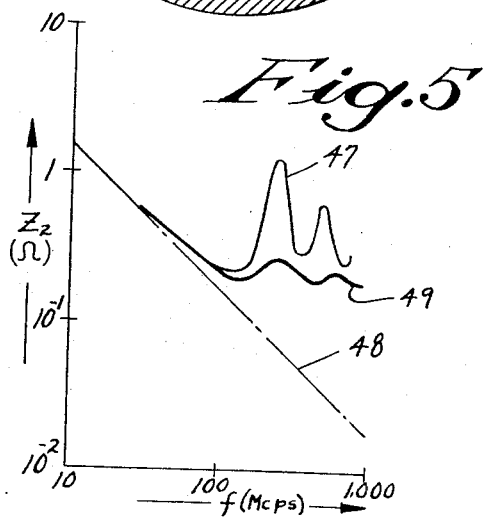
Fig. 5 is a graph illustrating the performance of the capacitor shown in Fig. 1 compared with a standard tubular feed-through capacitor of the same size.

Referring again to Fig. 1, the cylindrical dielectric body 11, when connected in circuit and excited by a high frequency current on conductor 24, may be considered to represent the electrical equivalent of a short section of transmission line. Such a transmission line, in the case of thin-wall tubular capacitors of the sizes customarily used in television receiving equipment, may be computed as having a characteristic impedance of the order of 1 ohm. Since the transmission line is not terminated in a load of similar impedance, reflections occur from the annular end walls, which create resonances within the dielectric body. This condition is illustrated in the light curve 47 of Fig. 5, which shows the actually measured transfer impedance from conductor 24 to chassis 22 of a standard tubular feed-through capacitor having a computed capacitance value of 10,000 mmf. The pronounced effect of solid body resonances at frequencies above 100 megacycles may be noted by reference to the dash-dot curve 48, which, in Fig. 5, represents the theoretical or computed transfer impedance of a capacitor of 10,000 mmf.

The discovery of this invention is that resonance within a dielectric body may be minimized if the electrodes, or at least one of the electrodes, has alternate contiguous areas of different specific electrical resistance. This electrode treatment is analogous to an axially extending discontinuity along a transmission line or, stated another way, corresponds to utilizing contiguous sections of transmission line having different characteristic impedances. This abrupt change of impedance along the critical axis of the dielectric body creates internal reflections within the dielectric body, so that it, by analogy, becomes a poor transmission line. This effect is manifested in the present instance by a substantial de-resonating of the dielectric body, as is observable by reference to the heavy curve 49 in Fig. 5, which represents the actually measured transfer impedance of a capacitor identical to that measured for curve 47, except that its outer electrode contained alternate areas of low and high resistance as shown in the embodiment of Fig. 1.

Mathematically, this means of de-resonating dielectric bodies may be explained by the fact that the generalized expression for the impedance of a transmission line, that is $$Z = \sqrt{\frac{\omega L}{\omega C}}$$

may be rendered complex by the addition of resistance, in which case the transfer impedance Z is given by the equation $$Z = \sqrt{\frac{R + j\omega L}{G + j\omega C}}$$

where R is the resistance in the series branch of the network and G is the conductance in the parallel branch. Examination of the complex expression for impedance shows that by varying the resistance R in the series branch of the circuit the characteristic impedance may likewise be varied.

Hence, the utilization of contiguous areas of different resistance, as shown in Fig. 1, for example, produces by analogy contiguous sections of transmission line of different characteristic impedance, with resultant de-resonating internal reflections.

It has been found that de-resonating may be accomplished by changing the resistance, for example, in rings 15 and 16 of Fig. 1, from 1 milliohm for ring 15 to about 1 ohm for ring 16. This 1000 to 1 resistance ratio will produce a better than fifty percent change in characteristic impedance and a substantial difference in the phase angle in the contiguous sections. These impedance and phase angle changes produce a pronounced de-resonating effect, as illustrated in curve 49 of Fig. 5. Lesser or greater effects may be produced by using different resistance ratios, it being preferred that the ratio of specific resistances exceed 20 to 1. It should be pointed out that for the embodiments illustrated, that is feed-through capacitors, it is somewhat preferable that the inner electrode such as 12 in Fig. 1 be continuous and of a low resistance so that no D.C. voltage drop develops in parallel with conductor 24. In instances where such a voltage drop is of no consequence, the principle of altering electrode resistance may be applied to the inner electrode as well as the outer, with increased de-resonating effect.

It should be understood that the varying resistance areas in electrodes 14 and 32 are electrically joined at their abutting edges so that as a capacitor electrode the electrical effect is substantially continuous. The areas need not be symmetrical geometrically as illustrated in Figs. 1-4, but may be trapezoidal or truncated sections, or sections with irregular boundaries.

The increased resistance in rings 16 and 34 may be accomplished in any convenient manner as, for example, by adding a powder of either an insulating or an electrically resistive material, ferrite being an example, to a silver paste, which is then fired in place on the dielectric body. It has been found that the addition of from five to forty percent of ferrite by weight is effective in producing the result exemplified by curve 49 in Fig. 5. Air dried silver paste is a further example.

The low resistance areas, such as 15 and 33, may similarly be made in any convenient manner, as by firing silver paste in place.

The dielectric bodies, such as 11 in Fig. 1 and 27 in Fig. 3, may be made from high dielectric constant materials, such as the titanates presently used for such purposes. It is preferred that the material used have a dielectric constant of 50 or over so that reasonable capacitance values may be obtained in small capacitors.

The application of electrodes having varying bands of electrical resistance may be used in conjunction with corrugated or sawtooth dielectric bodies as disclosed in my copending application, Serial No. 721,577, filed March 14, 1958, or in conjunction with ferrite loading, one example of which is disclosed in my copending application, Serial No. 720,266, filed March 10, 1958.

The number of sections of electrode utilized and their axial length may be varied, with de-resonating effects improving as the number of sections are increased and as their axial lengths are reduced. The use of five sections in Fig. 1 and three sections in Fig. 3 are intended to be illustrative only.

The specific embodiments illustrated for the purpose of disclosure are intended to be exemplary of the present invention and not limitations thereof. Accordingly, the invention should be construed by the scope of the claims rather than by the embodiments selected for illustration.

I claim:

1. A capacitor comprising a dielectric substance having a dielectric constant greater than 50, a pair of electrodes disposed thereon with the dielectric substance between the electrodes, one of said electrodes comprising a continuous conductor of bands of alternate electrically joined areas of different specific electrical resistance to form a de-resonating discontinuity to high frequency currents in the dielectric.

2. A capacitor comprising a solid dielectric substance having adherent electrodes disposed thereupon in capacitive relationship with the dielectric substance between the electrodes, one of said electrodes having contiguous, alternate areas of different specific electrical resistance with the ratio of the specific resistance values of alternate areas being greater than 20 to 1, said areas being electrically connected whereby each area functions as a portion of a continuous electrode.

3. A capacitor comprising a titanate ceramic body having a dielectric constant in excess of 50, a pair of electrodes disposed in capacitive relationship on opposed surfaces of said body, one of said electrodes having alternate, coaxial, areas of differing electrical resistance, the difference in such resistance being of a relative magnitude in excess of 50 to 1, said areas being electrically joined to form a unitary electrode.

4. A capacitor comprising a generally tubular ceramic dielectric body; a first metallic electrode disposed on the inner surface of said body and adapted for connection to a circuit; a second metallic electrode disposed on the outer surface of said body in capacitive relationship with the first electrode and adapted for connection to a circuit; one of said electrodes having an axially extending ring shaped portion of relatively low resistance and a contiguous conductive axially extending ring shaped portion of higher resistance electrically joined to said portion of low resistance to form a unitary electrode.

5. A capacitor according to claim 4 having a plurality of relatively low resistance portions and a plurality of higher resistance portions.

6. A feed-through capacitor comprising a generally tubular dielectric body; a first metallic electrode disposed on the inner surface of said body and having extensions covering a portion of the annular end portions of the tube; a second metallic electrode disposed on the outer surface of said body in capacitive relationship with the first electrode; one of said electrodes having the metallic substance thereof subdivided into axially extending, alternate, contiguous areas of materials having different specific electrical resistance, said areas being electrically connected to form a unitary electrode with the alternate areas effecting reflections in the capacitor at the common boundary of the areas that deresonate the capacitor; and means electrically and mechanically joined to the outer electrode presenting a means for attachment to a chassis.

7. A capacitor comprising a ceramic dielectric body of discoidal configuration having a metallic electrode on one of the flat surfaces thereof and a second metallic electrode on the other flat surface; one of said electrodes having the metallic substance thereof subdivided into alternate, contiguous, concentric areas of material of different specific electrical resistance, said areas being electrically connected to form a unitary electrode with the alternate areas effecting reflections in the capacitor at the common boundary of the areas that deresonate the capacitor.

8. A feed-through capacitor comprising a ceramic dielectric body of discoidal configuration having an axial aperture, a metallic electrode on one of the flat annular surfaces thereof and a second metallic electrode on the other flat annular surface, one of said electrodes having alternate, contiguous, electrically connected areas of material of different specific electrical resistance in which the ratio of specific resistances of alternate areas is greater than 20 to 1; a metallic housing surrounding said dielectric body and mechanically and electrically joined to one of the electrodes; and a feed-through conductor passing through the aforesaid aperture and electrically joined to the other electrode.

9. In a capacitor the combination of a dielectric with a dielectric constant greater than 50; and a pair of conductive electrodes disposed upon the dielectric with the dielectric therebetween, at least one of said electrodes being subdivided into adjacent alternate conductive areas that form a continuous conductive surface in which alternate areas have different specific electrical resistance to effect reflections of waves in the capacitor to deresonate the same.

References Cited in the file of this patent

UNITED STATES PATENTS

| 2,111,710 | Van Loon | Mar. 22, 1938 |
| 2,126,915 | Norton | Aug. 16, 1938 |

OTHER REFERENCES

"Sprague Button Ceramic Capacitors," Electronic Design, May 1955, page 31.